Patented Dec. 30, 1930

1,787,078

UNITED STATES PATENT OFFICE

WILLIAM T. LITTLE, OF WESTFIELD, NEW JERSEY

METHOD OF PRODUCING SODIUM STANNATE

No Drawing.      Application filed September 10, 1929.   Serial No. 391,707.

This invention relates to an improved method of producing sodium stannate, and in particular to improvements in methods of recovering sodium stannate in crystalline form from aqueous solutions containing the same.

Sodium stannate has heretofore been produced from various primary tin-bearing materials in various ways. Tin-bearing materials, such as tin scrap or tin-bearing alloys, may be treated with a hot sodium hydroxide solution in the presence of sodium nitrate or other oxidizing agent to form a solution of sodium stannate. In other methods, stannic hydroxide is treated with a hot sodium hydroxide solution; or a tin-bearing material such as cassiterite, is subjected to the action of a fused sodium hydroxide bath followed by leaching of the fusion obtained. In all of these processes, the sodium stannate is obtained in aqueous solution. From these solutions, sodium stannate crystals can be obtained by evaporation and crystallization; a method which however is subject to some objections.

Since the solubility of sodium stannate crystals is practically the same in hot or cold solution, purification of the crystals by the usual re-crystallization methods is out of the question. If pure stannate crystals are to be obtained by evaporation of a stannate solution, the starting solution must be low in impurities, such as free NaOH and $Na_2CO_3$. This is necessary, since the stannate crystals in the form of hexagonal plates retain these impurities in the form of occluded mother liquors, in which the concentration of these impurities is increased by the evaporation. Caustic soda and sodium carbonate are practically always present in these liquors. As stated, any substantial concentration of caustic soda, etc. leads to impure crystals; but on the other hand when stannate solutions with a low free NaOH concentration are evaporated the stannate tends to hydrolyze, a tin hydrate separating out which contaminates the crystals.

I have discovered that a better, cheaper and easier way of producing crystallized stannate is to precipitate by "salting out" instead of by concentration of the solution.

By the present process sodium stannate may be readily produced as a high grade commercial product of uniformly high tin content. Sodium stannate is practically insoluble in strong caustic solutions, so that at a concentration of approximately 35 grams NaOH in 100 cc., practically no sodium stannate will dissolve; and I have found that a strong caustic solution can be used as a precipitant for sodium stannate, throwing down the stannate as a crystal meal, readily washed, handled, packaged and stored. On adding a caustic solution quickly to a sodium stannate solution, sodium stannate crystals are immediately precipitated. These crystals differ from those formed by evaporation in that while the crystal form is the same, the crystals are very finely divided. They may be readily separated from the solution by filtration or centrifuging to give a crystal product of high purity, containing from 40 to 45 per cent Sn. By this method of precipitation, with proper adjustment of the strength of the stannate and of the caustic solutions, 90 per cent of the stannate present may be precipitated out of solution, giving stannate crystals of high purity. Crystals may be precipitated by this method either from a saturated or an unsaturated stannate solution. The solution from which the crystals have been separated by filtration or centrifuging contains the caustic soda used. It may be evaporated down, thereby obtaining a strong caustic solution which may be again used for precipitation in the manner described. Since only a relatively small amount of stannate crystals separate out on evaporation of this mother liquor, the use of any device for separating the crystals during evaporation is unnecessary and it is possible to use a simple type of evaporator.

A typical example of the procedure is as follows. An impure sodium stannate solution was used which analyzed as follows:

Total NaOH—12.70 grams per 100 cc.
Free NaOH— 5.70 grams per 100 cc.
Sn— 9.85 grams per 100 cc.

To this solution a caustic solution which contained 51.7 grams NaOH per 100 cc. was added until the resultant mixture contained approximately 20 grams per 100 cc. of free NaOH. The precipitated crystals were then separated from the solution by centrifuging and the solution run to the evaporator to be concentrated back to the original strength. The crystals obtained by this method were very fine, free from moisture, and dissolved readily in water to a clear solution.

They analyzed as follows:

Total NaOH—29.04 per cent
Sn—41.83 per cent
NaOH as free NaOH
and $Na_2CO_3$ — 0.84 per cent

What I claim is:

1. In the recovery of sodium stannate in crystalline form from sodium stannate solutions, the process which comprises adding a strong NaOH solution to such a sodium stannate solution, thereby precipitating crystals of sodium stannate.

2. In the recovery of sodium stannate in crystallized form, the process which comprises producing a sodium stannate solution from tin-bearing materials, adding a strong caustic soda solution to the solution thus produced and thereby precipitating sodium stannate as crystals, said caustic soda being a recovered solution from a later operation, separating these crystals from the mother liquor and evaporating said mother liquor to reproduce the caustic soda solution used in precipitating.

3. In the recovery of pure sodium stannate from sodium stannate solutions, the process which comprises adding to such a sodium stannate solution a solution of caustic soda containing at least 50 grams NaOH per 100 cc., the amount of such added caustic solution being sufficient to bring the concentration of free NaOH in the mixture to between 15 and 25 grams per 100 cc. and separating from the mother liquor the crystals of sodium stannate precipitated by the caustic soda solution.

4. In the recovery of pure sodium stannate from sodium stannate solutions with cyclic use of caustic soda as a precipitant, the process which comprises producing a sodium stannate solution from tin-bearing materials, adding thereto a recovered caustic liquor containing at least 50 grams per 100 cc. of free NaOH in amount sufficient to bring the concentration of free NaOH in the combined liquids to between 15 and 25 grams per 100 cc., separating the sodium stannate crystals thereby precipitated and concentrating the mother liquor to reproduce the stated caustic liquor used in precipitating.

In testimony whereof I affix my signature.

WILLIAM T. LITTLE.